(12) United States Patent
Lenner et al.

(10) Patent No.: US 6,721,900 B1
(45) Date of Patent: Apr. 13, 2004

(54) SAFETY NETWORK FOR INDUSTRIAL CONTROLLER HAVING REDUCED BANDWIDTH REQUIREMENTS

(75) Inventors: Joseph A. Lenner, Hudson, OH (US); David A. Vasko, Macedonia, OH (US); Kerry W. Vandesteeg, Chagrin Falls, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 545 days.

(21) Appl. No.: 09/664,154

(22) Filed: Sep. 18, 2000

Related U.S. Application Data

(60) Provisional application No. 60/171,439, filed on Dec. 22, 1999.

(51) Int. Cl.[7] ................................................ G06F 11/00
(52) U.S. Cl. ........................................................ 714/4
(58) Field of Search ............................ 714/4, 7, 10, 11, 714/20, 25, 26, 37, 39, 43, 47, 6

(56) References Cited

U.S. PATENT DOCUMENTS

| | | | |
|---|---|---|---|
| 4,995,040 A | * 2/1991 | Best et al. | 714/797 |
| 5,155,729 A | * 10/1992 | Rysko et al. | 714/11 |
| 5,508,910 A | * 4/1996 | Diehl | 700/82 |
| 5,910,778 A | 6/1999 | Klein et al. | |
| 6,148,414 A | * 11/2000 | Brown et al. | 714/9 |
| 6,167,547 A | * 12/2000 | Senechal et al. | 714/732 |
| 6,473,660 B1 | * 10/2002 | Thibault | 700/79 |

FOREIGN PATENT DOCUMENTS

EP    9 977 391 A2    2/2000

OTHER PUBLICATIONS

ESALAN Safety Field Bus Control System.
(Mar. 18, 1999) Draft Proposal of a Guideline for the Test and Certification of "Bus Systems for the Transmission of Safety Relevant Messages".
Cevik, Dr. Ing. Kemal (Jun. 1, 1999) Minutes of the $3^{rd}$ Meeting, CANopen SIG Safety, and Report on Safety Bus Meeting (Jul. 21, 1999).
Pilz Review Extra (1999, Autumn).
Safenet Brochure, Smartscan Limited.
ProfiSafe Brochure.
(1999, Apr.), Draft Profibus Profile, Order No.: 3.092, Revision 1.0, Karlsruhe, Germany, PROFIBUS Nutzerorganisation e.V.
(1998, Oct.) Pilz Safe Bus Systems Brochure, Pilz Automation Technology.
(1999, Aug.), Safenet Information, <EBUS> 6000 Product List, Safenet, Ltd., Corby, Northants, United Kingdom.
Interoperable fieldbus devices: a technical overview, ISA Transactions, U.S. Instrument Society of America, Pittsburgh PA., vol. 35, No. 2, 1996, pp. 147–151.

* cited by examiner

*Primary Examiner*—Nadeem Iqbal
(74) *Attorney, Agent, or Firm*—Quarles & Brady; Alexander M. Gerasimow; R. Scott Speroff

(57) ABSTRACT

A highly reliable industrial control system provides for the processing of redundant control signals on as little as a single serial network without overloading the network by preprocessing input signals for coincidence and sending only the coincidence signal either periodically or on a change of state. Further compression of sent data is realized by extracting a reduced subset of transmission states from the input signals and transmitting only the transmission states.

26 Claims, 13 Drawing Sheets

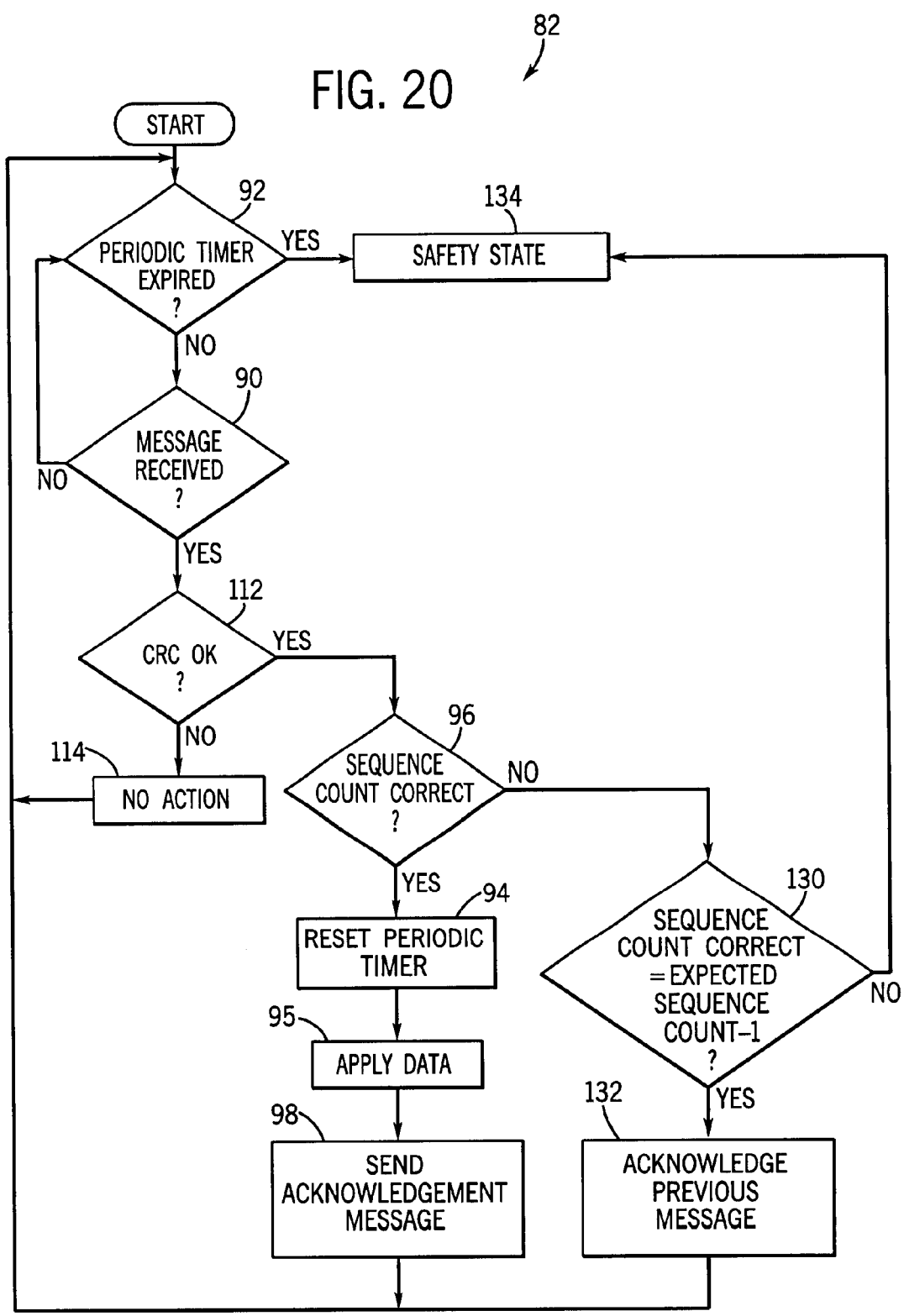

SAFETY NETWORK FOR INDUSTRIAL CONTROLLER HAVING REDUCED BANDWIDTH REQUIREMENTS

CROSS-REFERENCE TO RELATED APPLICATIONS

This application claims the benefit of provisional application No. 60/171,439 filed on Dec. 22, 1999.

STATEMENT REGARDING FEDERALLY SPONSORED RESEARCH OR DEVELOPMENT

BACKGROUND OF THE INVENTION

The present invention relates to industrial controllers used for real-time control of industrial processes, and in particular to high-reliability industrial controllers appropriate for use in devices intended to protect human life and health. "High reliability" refers generally to systems that guard against the propagation of erroneous data or signals by detecting error or fault conditions and signaling their occurrence and/or entering into a predetermined fault state. High reliability systems may be distinguished from high availability system, however, the present invention may be useful in both such systems and therefore, as used herein, high reliability should not be considered to exclude high availability systems.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

"Safety systems" are systems intended to ensure the safety of humans working in the environment of an industrial process. Such systems may include the electronics associated with emergency stop buttons, interlock switches and machine lockouts. Traditionally, safety systems have been implemented by a set of circuits wholly separate from the industrial control system used to control the industrial process with which the safety system is associated. Such safety systems are "hard-wired" from switches and relays, some of which may be specialized "safety relays" allowing comparison of redundant signals and providing internal checking of conditions such as welded or stuck contacts. Safety systems may use switches with dual contacts providing an early indication of contact failure, and multiple contacts may be wired to actuators so that the actuators are energized only if multiple contacts close.

Hard-wired safety systems have proven inadequate, as the complexity of industrial processes has increased. This is in part because of the cost of installing and wiring relays and in part because of the difficulty of troubleshooting and maintaining the "program" implemented by the safety system in which the logic can only be changed by rewiring physical relays and switches.

For this reason, there is considerable interest in implementing safety systems using industrial controllers. Such controllers are easier to program and have reduced installation costs because of their use of a high-speed serial communication network eliminating long runs of point-to-point wiring.

The redundant control signals used to detect failures in hard-wired systems (when they don't match) do not always change at exactly the same time. Accordingly a window of time is established during which lack of coincidence of the signals is ignored. Ideally, this window is short so that actual failures can be quickly identified.

A short coincidence window creates problems, however, when a high reliability system is implemented on a standard serial network such as is used in control systems. This is because for reasonable network bandwidths, queuing of messages introduces skew in the transmission of the redundant signals, requiring an undesirable lengthening of the transmission window. This is particularly true when the communications of signals requires reply messages with separate network transmissions.

What is needed is a safety network that is compatible with conventional industrial controller serial networks and components yet that provides the benefits that come from using redundant control signals. Ideally such a safety network would work the currently available bandwidths of industrial control networks.

BRIEF SUMMARY OF THE INVENTION

The present invention facilitates the transmission and use of redundant control signals on standard serial networks by moving the coincidence detection step to the message producers prior to transmission of the control signal on the network. A single coincidence signal is developed with a short coincidence window that may then be redundantly transmitted over the network. Because the coincidence is resolved prior to transmission, network skew does not require a lengthening of the coincidence window.

Specifically, the present invention provides a high reliability industrial control system having a controller with a first network interface to a shared serial network. The industrial control system also includes an input module with at least two interface circuits for receiving at least two redundant input signals, the interface circuits communicating with at least one processor via an internal bus. The processor further communicating with a second network interface to the shared serial network and executes a stored program to: receive the redundant input signals processed by the interface circuits; determine a coincidence of the redundant input signals within a window of a predefined time period; and only when there is coincidence within the window, transmit via the second network interface, at least one coincidence signal indicating a coincident state of the redundant input signals to the controller.

Thus it is one object of the invention to permit the use of a relatively short predefined time period for the coincidence window by eliminating the effect of network skew of the input signals.

The processor may further execute the stored program to transmit to the controller at least two redundant messages on the shared network indicating the coincident state of the redundant input signals when there is coincidence within the window.

Thus it is another object of the invention to eliminate the effect of network skew on the processing of redundant signals while preserving the redundant communications channels.

The interface circuit may include two processors with each interface circuit communicating with a different processor, and the processors may communicate with each other via an internal bus to each receive a different of the redundant input signals processed by the interface circuits and to communicate with the other processor to determine a coincidence of the redundant input signals within a window of a predefined time period; and only when there is coincidence within the window, to transmit to the controller via the second network interface, a common coincidence signal indicating a coincident state of the redundant input signals. The second network interface may include two redundant interface circuits each dedicated to one of the processors.

Thus it is a further object of the invention to provide the benefit of a reduced coincidence window while reserving redundancy in hardware components.

The input circuits may sample the redundant input signal at regular sample times and the processor may determine a coincidence as existing within the window by detecting a lack of coincidence and reviewing a predetermined number of samples commensurate with the period of time of the window and determining a coincidence only if coincidence is obtained at one of the predetermined number of samples.

Thus it is another object of the invention to provide a simple method of determining coincidence within a window such as may be executed by input and output circuits.

The invention may further include a third network interface to the shared serial network for creating an output signal related to at least one of the redundant input signals and the output circuit may communicate its output signal to the input module via the third network interface and wherein the communicated output signal is the coincidence signal.

It is a further object of the invention to prevent the accumulation of network skew, and its adverse effect on the coincidence window, in messages that may be multiply transmitted first to an output circuit, then back to the originating input circuit.

The invention may provide four input circuits for receiving at least two pairs of redundant input signals and the processor may further execute the stored program to receive the two pairs of redundant input signals processed by the interface circuits; determine a first and second coincidence of the respective pairs of redundant input signals within at least one window of the predefined time period; and only when there is coincidence within the window for each of the two pairs of input signals map the state of the two pairs of inputs to a lesser number of transmission states, transmitting via the second network interface, at least one coincidence signal indicating a transmission state of the redundant input signals to the controller.

Thus it is another object of the invention to provide for further compression of data to be sent over the network by abstracting from input data a subset of states that may be either expressed in smaller amounts of data or that may be less frequently transmitted at fewer times of state changes.

The foregoing and other objects and advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE DRAWINGS

FIG. 20 is a flow chart of a program executed by the consumers of FIG. 9 in implementing the safety protocol of the present invention.

DETAILED DESCRIPTION OF THE INVENTION

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

Figure 1:
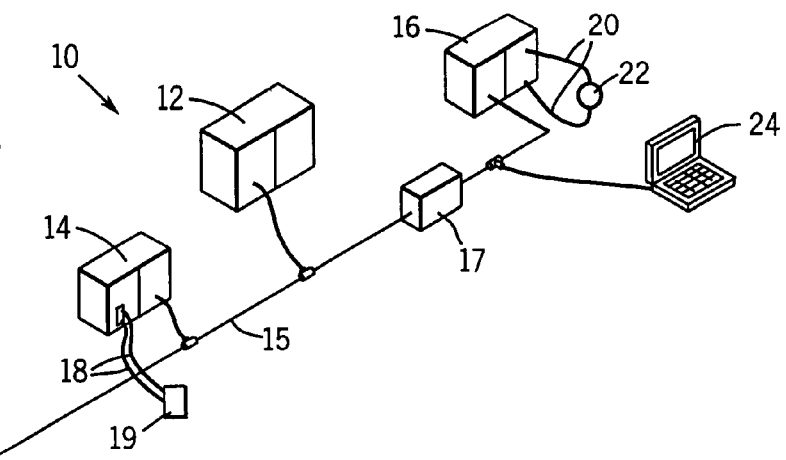
FIG. 1 is a perspective view of a simplified industrial controller using a standard serial communication network linking a central controller with remote input and output circuits and with a remote configuration terminal, such as may be used in the present invention.

Referring now to FIG. 1, an industrial control system 10 for implementing a safety system with the present invention includes a controller 12 communicating on a serial network 15 with remote input module 14 and remote output module 16. The network 15 may be a standard and commonly available high-speed serial network including but not limited to: Ethernet, DeviceNet, ControlNet, Firewire or FieldBus. The network 15 may optionally include a bridge 17 translating between different of the above standard or other protocols. As will be understood from the following, the present invention may be easily adapted to bridge applications.

Input module 14 may accept input signals 18 (on like-designated lines) which are communicated over the network 15 to the industrial controller 12. At the industrial controller 12 the signals 18 may be processed under a control program implementing a safety system (such as a machine lock-out or emergency stop) and further signals sent to the output module 16 which may produce output signals 20 (on like-designated lines) to an actuator 22.

The input signals 18 may come from a switch 19 which may be any of a variety of devices producing safety input signals including but not limited to emergency stop switches, interlock switches, light curtains and other proximity detectors. The actuator 22 may be a relay, solenoid, motor, enunciator, lamp or other device implementing a safety function.

Also connected to the network 15 is a standard computer, which may be used as a configuration terminal 24 whose purposes will be described below.

Redundant System Hardware

Figure 2:
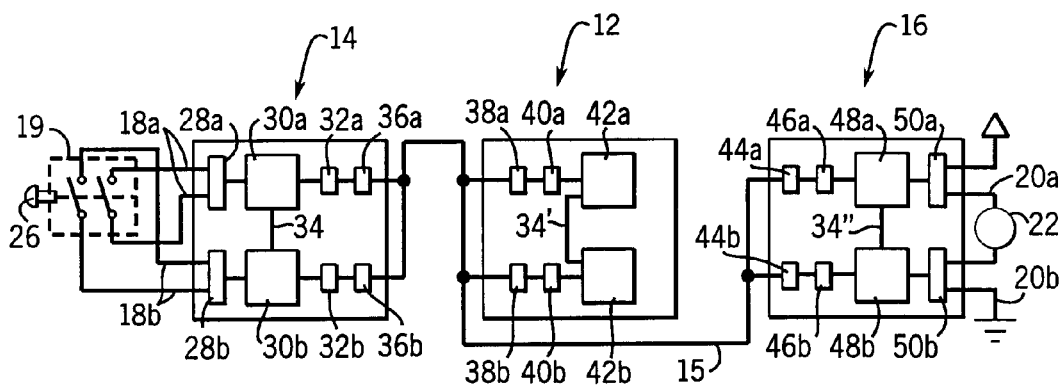
FIG. 2 is a schematic block diagram of the control system of FIG. 1 showing redundant wiring from an input switch to the input circuit of FIG. 1, the input circuits having redundant components such as may process the signals from the input switch to send signals over the communication network to the controller of FIG. 1, the controller having redundant processors to send signals over the communications network to the output circuit of FIG. 1, the output circuit having redundant components to provide outputs to an actuator.

Referring now to FIG. 2, the switch 19 may produce redundant signals 18a and 18b where signal 18a is, for example, from a first contact within the switch 19, and signal 18b is from a second independent contact within switch 19. The contacts may have the same logic (as shown) both being normally open (e.g., closed with actuation of a pushbutton 26) or may be inverted logic with one contact normally open and one contact normally closed. In either case, redundant signals 18a and 18b are generated so as to provide for higher reliability in the determining the state of the switch 19.

The input module 14 may include redundant interface circuitry 28a receiving signal 18a and interface circuitry 28b receiving signal 18b. Alternatively, but not shown, interface circuitry 28a and 28b may each receive both signal 18a and 18b (for internal comparison) or may receive signals 18a and 18b from a single contact. The contacts, in generating signals 18a and 18b, may each be provided with a separate voltage from the input circuitry 28a and 28b or from a common voltage source (not shown). Other redundant variations on these wiring systems, known in the art, may also be used.

Each of the interface circuitry 28a and 28b may in turn provide signals to associated microcontrollers 30a and 30b. Microcontrollers 30a and 30b provide a computer processor, memory and a stored program for executing safety protocol programs as will be described below. Alternatively, or in addition, the safety protocol may be executed by safety protocol circuits 32 with which microcontrollers 30a and 30b communicate. In this case, the safety protocol circuits 28a and 28b may be application-specific integrated circuits (ASIC). As it is well known in the art to implement protocols through hardware or software or combinations of each, the term "protocol device" as used herein and in the claims should be understood to embrace generally any combination of software and hardware components implementing the indicated functions.

The microcontrollers 30a and 30b may communicate with each other through an internal bus 34 to compare signals 18a and 18b as will be described.

Microcontrollers 30a and 30b or safety protocol circuits 28a and 28b in turn connect to standard network protocol circuits 36a and 36b of a type well known in the art for handling the low level protocol of the standard network 15. Typically, the standard network protocol circuits 36a and 36b are implemented by an ASIC whose implementation represents considerable development time and which cannot be easily modified.

The standard network protocol circuits 36a and 36b transmits signals from the input module 14 on the network 15 to be received at the controller 12 through a similar standard network protocol circuits 38a and 38b. These signals are processed by the standard network protocol circuit 38 and provided to redundant safety protocol circuits 40a and 40b, being similar to safety protocol circuits 32a and 32b described before. These safety protocol circuits 40a and 40b communicate with processors 42a and 42b, respectively, which include separate memory systems and control programs according to well-known redundancy techniques and which intercommunicate on internal bus 34'. Output signals generated by the processors 42a and 42b may be communicated back through the safety protocol circuits 40a and 40b to implement the safety protocol, as will be described below (or alternatively, the safety protocol may be handled by the processor 42a and 42b), and the output signals communicated to the standard network protocol circuits 38a and 38b for transmission again on network 15 to output module 16.

Output module 16 may receive output data through a standard network protocol circuits 44a and 44b being similar to standard network protocol circuits 36a and 36b and 38a and 38b. The standard network protocol circuits 44a and 44b provide the data to safety protocol circuits 46a and 46b, which in turn provide them to redundant controllers 48a and 48b. As before, alternatively, the safety protocol may be handled by the controllers 48a and 48b instead. The controllers 48a and 48b communicate by internal bus 34" and in turn provide signals to output interface circuits 50a and 50b which provide the output signals 20a and 20b. The output signals may be connected to the actuator 22 so that outputs must be enabled for the actuator 22 to be powered. In this sense, a default safety state is produced (of no power to the actuator 22) if there is an inconsistency between the signals received by processors 48a and 48b. A change in the wiring to parallel configurations could create a safety state where the actuator is actuated unless both signals received by processors 48a and 48b are not enabled.

Alternatively, and as will be described, a safety state may be enforced by a safety state signal transmitted from the controller 12 or the input module 14 to the microcontrollers 48a and 48b of output module 16, the latter which may respond by producing outputs to output interface circuits 50a and 50b determined by stored values of desired safety states programmed through the configuration terminal 24 as will be described further below.

A bridge circuit 17 per the present invention could use the basic structure shown in the input module 14 but replacing the interface circuitry 28a and 28b of input module 14 with network protocol circuits 38a and 38b and safety protocol circuits of 40a and 40b (where the network protocol circuits 38 and 36 are for different protocols, thereby allowing seamless transmission of safety data per the techniques described below).

Figure 3:
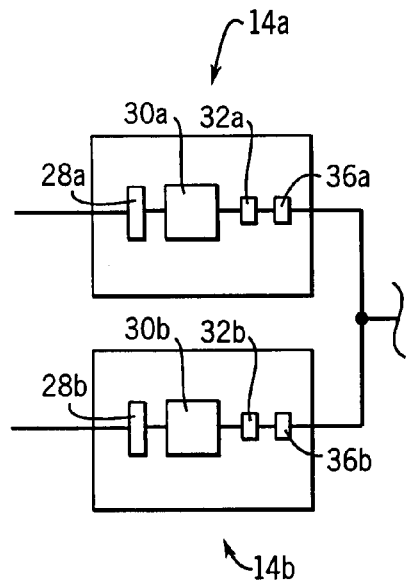
FIG. 3 is a fragmentary view similar to FIG. 2, showing an alternative configuration of the input circuit of FIG. 2 using conventional control input circuits without redundant components.

Referring now to FIG. 3, specialized redundant input module 14, in the present invention, may be replaced with two standard input modules 14a and 14b, input module 14a holding the equivalent of previously described interface circuitry 28a, microcontroller 30a, safety protocol circuit 32a and standard network protocol circuit 36a; and input module 14b holding the equivalent of interface circuitry 28b, microcontroller 30b, safety protocol circuit 32b, and standard network protocol circuit 36b. In this case, the operation of safety protocol circuits 32a and 32b are implemented in the firmware of the microcontrollers 30a and 30b and effected via messages communicated on the network 15 rather than the internal bus 34.

Figure 4:
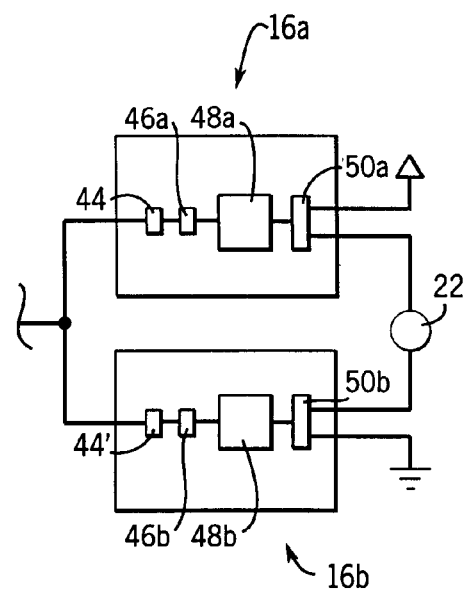
FIG. 4 is a fragmentary view similar to FIG. 2, showing an alternative configuration of the output circuit of FIG. 2 using conventional control output circuits without redundant components.

Likewise, referring to FIG. 4, the redundancy of output module 16 may be implemented by separate output circuits 16a and 16b, output module 16a including the equivalent of standard network protocol circuit 44, safety protocol circuit 46a, microcontroller 48a, and output interface circuit 50a, with output module 16b including the equivalents of standard network protocol circuit 44 as 44', safety protocol circuit 46b, microcontroller 48b, and output interface circuit 50b. As will be described below, the present invention provides a protocol that is indifferent to the exact parsing of the safety components among physical devices having addresses on the network 15.

Figure 5:
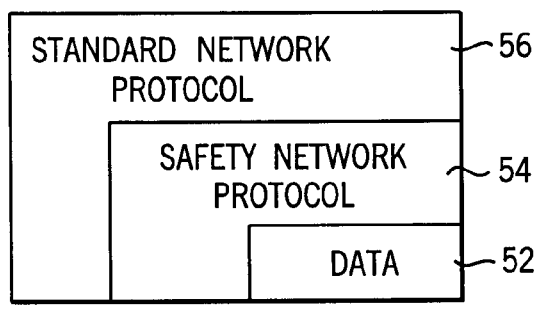
FIG. 5 is a representational view of the dual communication protocols provided by the present invention in which data is first encoded with a safety protocol and then with a network protocol to be compatible with the serial network.

Referring now to FIGS. 5 and 2, the operation of the safety protocol circuits 32 and standard network protocol circuits 36 in the input circuit is to embed input data 52 from lines 18b within a safety-network protocol 54 implemented both as additional data attached to messages sent on network 15 and in the management of that data as will be described. The safety-network protocol 54 is in turn encapsulated in the standard network protocol 56 for seamless transmission on the network 15.

The Safety Network Protocol

Referring now to FIGS. 5 and 2, the operation of the safety protocol circuits 32, 40 and 46 in conjunction with the standard network protocol circuits 36, 38 and 44 is to embed I/O data 52 (e.g., from lines 18b) within a safety-network protocol 54 implemented both as additional data attached to I/O data 52 sent on network 15 and in the management of the particulars of transmission of that I/O data 52. The safety-network protocol 54 is in turn encapsulated in the standard network protocol 56 for seamless transmission on the network 15.

The data encapsulated in the safety-network protocol 54 and standard network protocol 56 can then be received (e.g., by the controller 12) and extracted through the successive operation of the standard network protocol circuits 36, 38 and 44 and the safety protocol circuits 32, 40 and 46 to provide the I/O data 52 in its basic state. Note that FIG. 5 is only symbolic of the process and that the safety-network protocol 54 is not simply an encapsulation of the data 52 within for example safety data headers but rather the safety protocol includes timing constraints that may be executed in sequence with the standard network protocol 56 so that the safety-network protocol 54 may operate within the standard network protocol 56 without modification of the network 15 or standard network protocol circuits 36, 38 and 44.

This dual level encapsulation and de-encapsulation is performed for each transmission of I/O data 52 on the network 15 that requires a high level of reliability commensurate with safety systems. For non-safety system data, the standard network protocol 56 may be used alone without the safety-network protocol 54 for communication with non-safety elements of the industrial control system 10. Because all data transmitted on the network 15 is embedded in the standard network protocol 56, the safety-network protocol 54 will work seamlessly with a variety of networks 15 providing they have data transmission capacity suitable for the I/O data 52 and sufficient in capacity to accept some added safety error detection data 58 of the safety-network protocol 54 as will be described.

Safety Message Formatting

Figure 6:
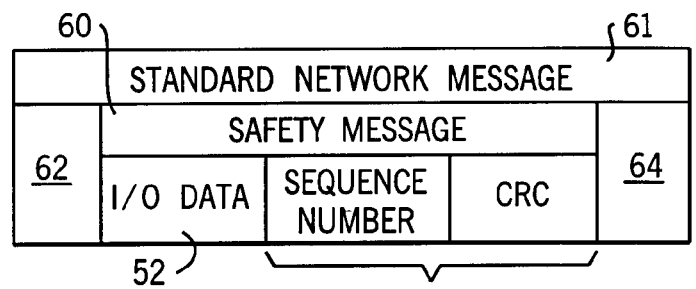
FIG. 6 is a schematic representation of a data word transmitted over the standard serial network showing the embedding of safety formatting data with I/O data within the formatting provided by the standard serial network.

Referring now to FIG. 6, a first aspect of the safety-network protocol 54 is that the I/O data 52 is attached to safety error detection data 58 to form a safety message 60 that forms the data provided to the standard network protocol circuits 36, 38 and 44 to produce a network message 61. The safety error detection data 58 may include a sequence count indicating the local order in which the safety message 60 is transmitted with respect to earlier transmissions of safety messages. The sequence count is normally limited in range (0–3) as it is intended, as will be described, to detect the loss of only a single message.

Also appended to the I/O data 52 and part of the safety error detection data 58 is a cyclic redundancy code (CRC) selected in the preferred embodiment to be twelve-bits. The cyclic redundancy code is functionally generated from the I/O data 52 and the sequence count so that an error in the transmission of either of those data elements can be detected when the CRC is recalculated by the receiving device and doesn't match. As is understood in the art, a twelve bit error code will allow the detection of errors with odd numbers of bit errors, all two-bit errors, all burst errors up to twelve bits and 99.951% of burst errors larger than twelve bits, for up to two-thousand and forty seven bits of data of the safety message 60.

The safety message 60 is embedded in the network headers and footers 62 and 64, which vary depending on the standard network protocol 56 of the network 15. Depending on the network 15, the network header and footer 62 and 64 may include a CRC code and sequence count and other similar safety error detection data 58 operating redundantly with the safety error detection data 58. Nevertheless, the safety message 60 includes its own safety error detection data 58 so as to be wholly network-independent to the degree possible.

Connected Messaging

Figure 9:
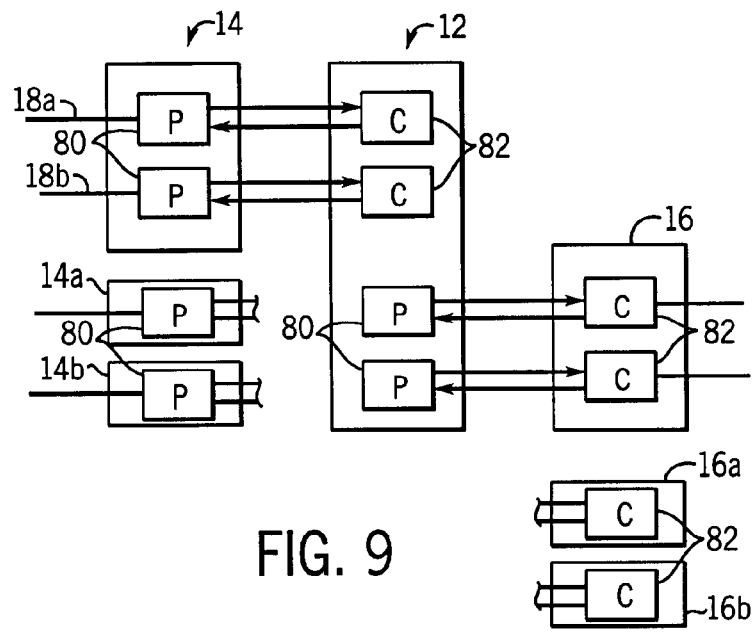
FIG. 9 is a block diagram of the industrial controller of FIG. 1 showing the division of communications between the input circuit, the controller and the output circuit into producer-consumer pairs such as provides redundant communication over a single network and the varied topologies of the implementations of FIGS. 2, 3 and 4.

As mentioned above, the safety error detection data 58 forms only part of the safety-network protocol 54. The safety-network protocol 54 also includes a configuration step that ensures proper communication under a connected messaging scheme. Referring now to FIG. 9, the communications between the controller 12, input module 14 (or input modules 14a and 14b) and the output module 16 (or output module 16a and 16b) may provide a connected messaging system. As is understood in the art, connected messaging involves opening a connection between pairs of logical devices one that acts as a "producers" of a message and one-that acts as a "consumers" of the message. The process of opening the connection reserves bandwidth of the network and reserves necessary processing and buffering resources at the producer and consumer to ensure that data of the connection will be reliably transmitted and received.

The connected messaging protocol may be implemented as part of the safety network protocol 54 or as part of the standard network protocol 56, the latter option limiting somewhat the types of standard networks 15 that may be used. Some standard network protocols that support connected messaging are DeviceNet and Control Net, Ethernet, and ATM.

Referring now to FIG. 9, under a connected messaging protocol, the input module 14 provides two producers 80 opening two connections with two consumers 82 of the controller 12, one for each of the signals 18a and 18b. As a practical matter, these two connections mean that two separate network messages 61 will be sent over the network 15 thus decreasing the chance of loss of both messages.

For the implementation of FIG. 3 with separate input module 14a and 14b, two producers 80 are also provided. Even though the producers 80 are now in different devices (having different addresses on the network 15), the operation of the control program implementing the safety system, above the connection level, need not changed by these changes in implementations. Connected messaging thus makes the safety system largely indifferent to topologies as providing for a natural redundancy over a single network, or multiple links Controller 12 likewise includes two producers 80 exchanging data with consumers 82 either in a single output module 16 per FIG. 2 or in separate output module 16a and 16b per the embodiment of FIG. 4. Two arrows are shown between each producer 80 and consumer 82 indicating the paring of each message with an acknowledgment message under the safety protocol 54 as will be described below, per FIG. 9.

The bridge circuit 17, not shown in FIG. 9, but as described above, would implement four consumers and four producers (two for each network side) as will be understood to those of ordinary skill in the art.

Safety Configuration Data and Protocol

Figure 10:
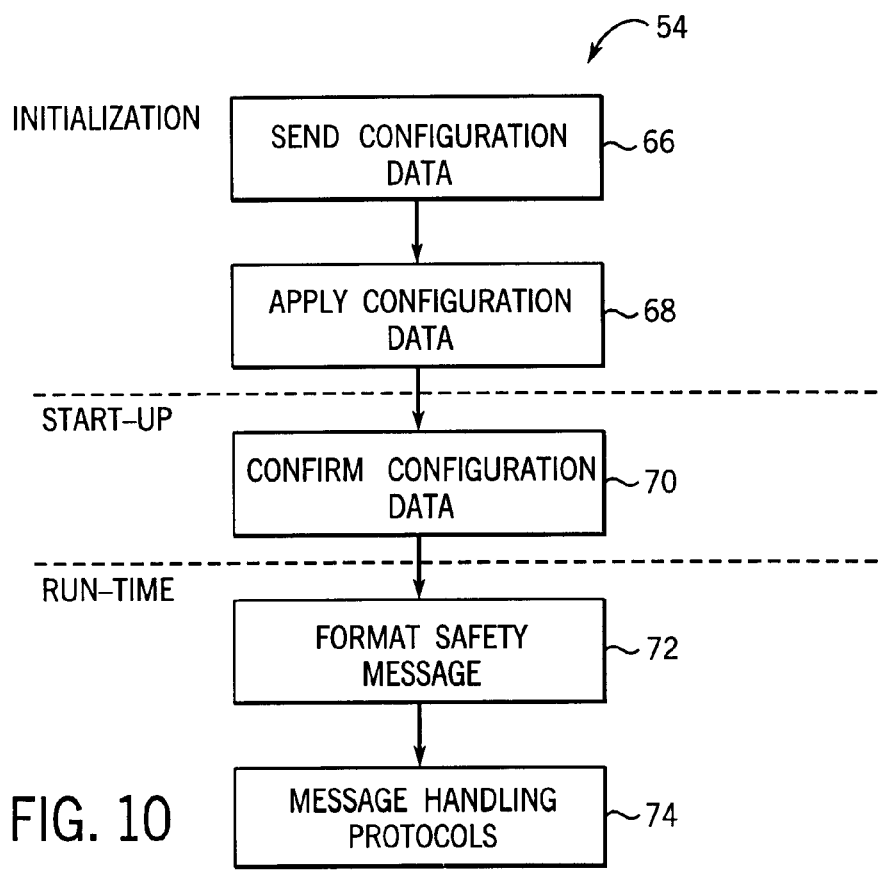
FIG. 10 is a flow chart showing the principle stages of the safety protocol of initialization, start-up, and run-time.

Referring now to FIG. 10, the safety protocol more generally includes an initialization state, of which the first step is developing configuration data as indicated by process block 66.

The configuration process involves developing configuration data at the configuration terminal 24 and ensuring that accurate copies of that configuration data are at each of the input module 14, the controller 12, and the output module 16. The configuration data is unique to each connection, provides essential components of the safety protocol, and identifies intercommunicating parties so as to reduce the possibility of improper connections injecting spurious data into the safety system. This is particularly important in allowing mixing of systems components observing the safety network protocol 54 with standard components observing only the standard network protocol. Devices may support multiple connections, in which case multiple configuration data specific to each connection will be used.

Generally, the configuration data include data uniquely identifying the particular device of the input module 14, the controller 12, and the output module 16 holding the configuration data, and particularly the serial number of that device. The serial number is a unique and immutable part of the physical devices and thus together with an internal address of the logical devices within the physical device (which may establish independent connections) the serial number provides each connection with a unique identity eliminating the possibility of crossed connections between different devices once the configuration data is properly disseminated. To augment the serial number, the configuration data may also include a vendor identification number, a device code, a product code, major revision, minor revision, as well as network data including the logical, physical address of the device, all known in the art and identifying the particular device. Similarly, the configuration data within a device may include the serial number of the device to which it is connected.

As mentioned, the connection data may also include data necessary for the implementation of the other aspects of the safety protocol as are yet to be described, including variables of "periodic time interval", "reply timer interval", "filter count", and "retry limit". The configuration data also includes the safety state to which the device will revert in the case of network error and a list of related I/O points indicating other I/O points (related to other connections), which should revert to the safety state if the present connection has an error. This later feature allows selective and intelligent disabling of the safety system upon a communication error as will be described. As will be evident from context, some of this data is dependent on the devices and the system programmer must develop some.

Figure 7:
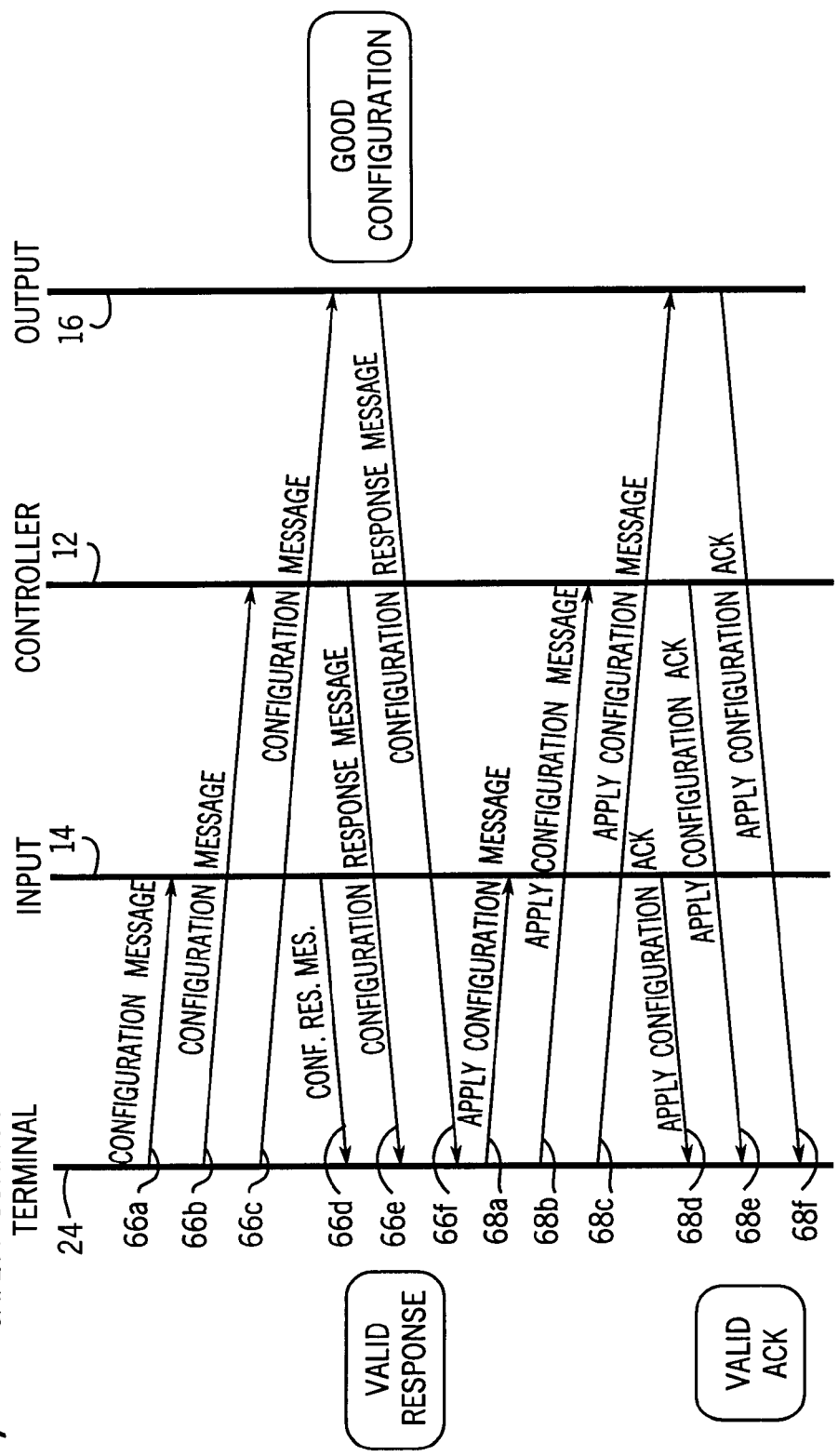
FIG. 7 is a graphical representation having time on the vertical axis and distance along the network on the horizontal axis, showing transmission of configuration messages to the input circuit, the controller and the output circuit, forming the foundation of the safety protocol of the present invention.

Referring to FIG. 7, configuration data held within the configuration terminal 24 is sent to each of the input module 14, the controller 12, and the output module 16 as messages 66a, 66b and 66c.

The receiving input module 14, the controller 12, and the output module 16 store the configuration and respond with the same configuration message but changed to a one's complement form (being simply a different binary coding (the inversion)) of the configuration data received. This one's complement message is returned by messages 66d, 66e, and 66f from the respective input module 14, the controller 12, and the output module 16. If the configurations of messages 66a, 66b and 66c exactly match (after complementing) configuration data of messages 66d, 66e and 66f, the configuration was successful.

The configuration data may be shown to a human operator for confirmation. If the operator finds that the configuration is correct, the configuration is applied as indicated by process 68 shown in FIG. 10 through messages 68a, 68b and 68c from the configuration terminal 24 to the respective input module 14, the controller 12, and the output module 16. The devices must acknowledge these messages via messages 68d, 68e and 68f within a predetermined time interval or the configuration will be cleared and no configuration will be considered to have occurred. The configuration data of messages 66 and 68 may be sent using only the standard network protocol 56.

Figure 8:
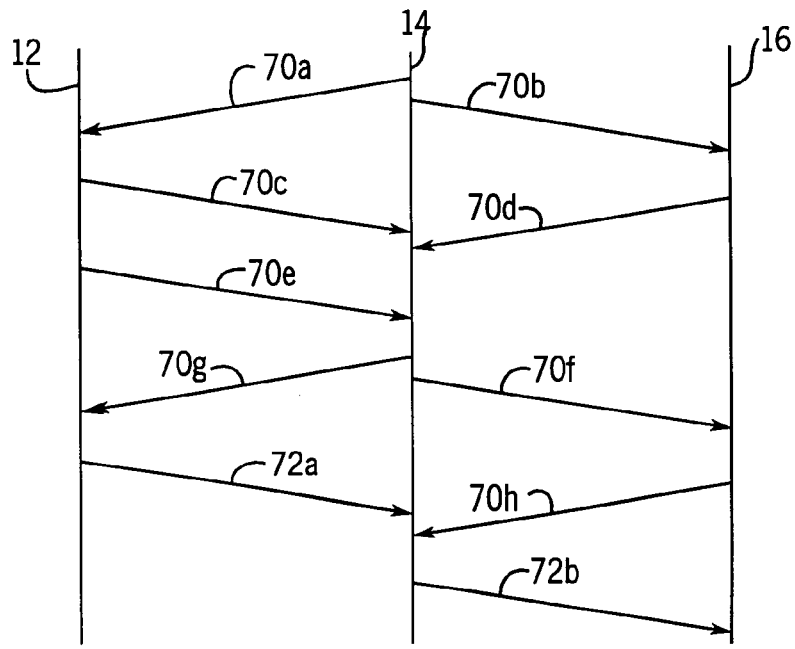
FIG. 8 is a figure similar to that of FIG. 7 showing the transmission of messages after the configuration process during a start-up and run-time phase of the network.

Once the configuration is complete, the safety protocol enters a start-up phase shown generally in FIGS. 8 and 10.

During the start-up phase, the necessary safety connections are established and the configuration data is used to verify that the connections expected are those which are in fact made. The purpose of the start-up portion of the configuration is to prevent erroneous connections from being opened between: (1) devices in the safety system and other erroneous devices in the safety system, and (2) devices in the safety system and other devices not in the safety system in a mixed system.

In this start-up process, indicated by process block 70 of FIG. 10, the connections are confirmed from the controller 12 to the input module 14 and the output module 16. In particular, the producers 80 in controller 12 (shown in FIG. 9) send out open connection messages 70*a* and 70*b* to the input module 14 and the output module 16, respectively. The appropriate consumers 82 respond with connection acknowledgment message 70*c* and 70*d*, respectively. The producers 80 in controller 12 and input module 14 then send the configuration data to the consumer 82 in the controller 12 as indicated by messages 70*e* and 70*f*. The controller's consumers 82 check to see that the configuration data matches their configuration data and then send acknowledgment messages 70*f* and 70*g* acknowledging that match. At messages 72*a* and 72*b*, conventional I/O data may then commence to be sent.

Referring again to FIG. 10, the data 72*a* and 72*b* will be transmitted according to the portions of the safety protocol indicated by process blocks 72 involving formation of the safety message 60 incorporating safety error detection data 58 into the network message 61 as has been described above, and according to message handling protocols 74 operating independent of and in conjunction with the content of the safety message 60 which will now be discussed.

Message Handling Safety Protocols (1) Normal Transmission

Figure 11:
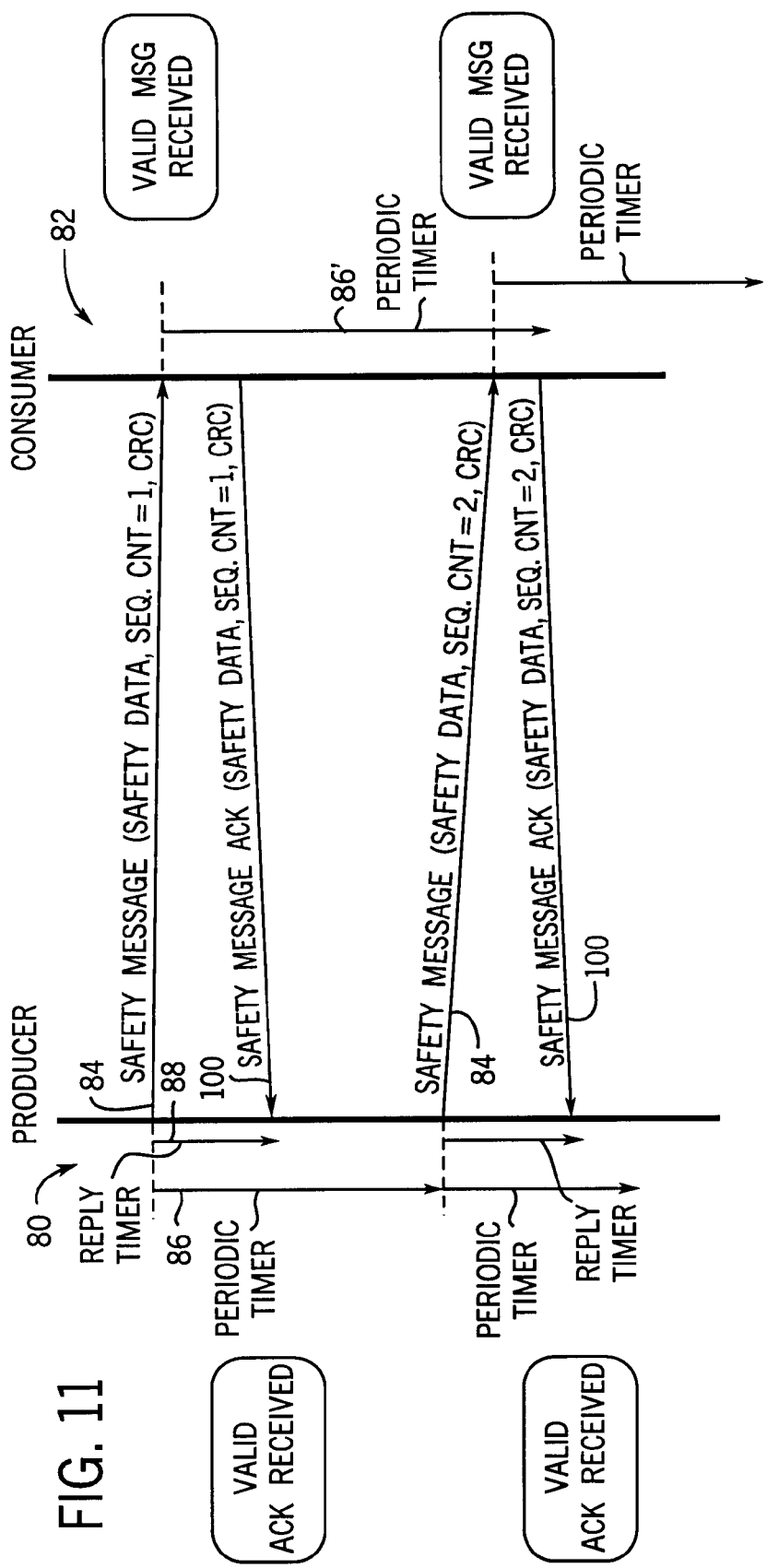
FIG. 11 is a figure similar to that of FIG. 7 showing normal protocol operation under the safety protocol of the present invention during run-time.

Referring generally to FIGS. 10 and 11, the message handling protocols 74 provide for message time measurements and respond to errors in the safety error detection data 58 during run-time. These message-handling protocols 74 are implemented in the safety protocol circuits 32, 40 and 46 or may be implemented in software and are different for producers and consumers.

Figure 19:
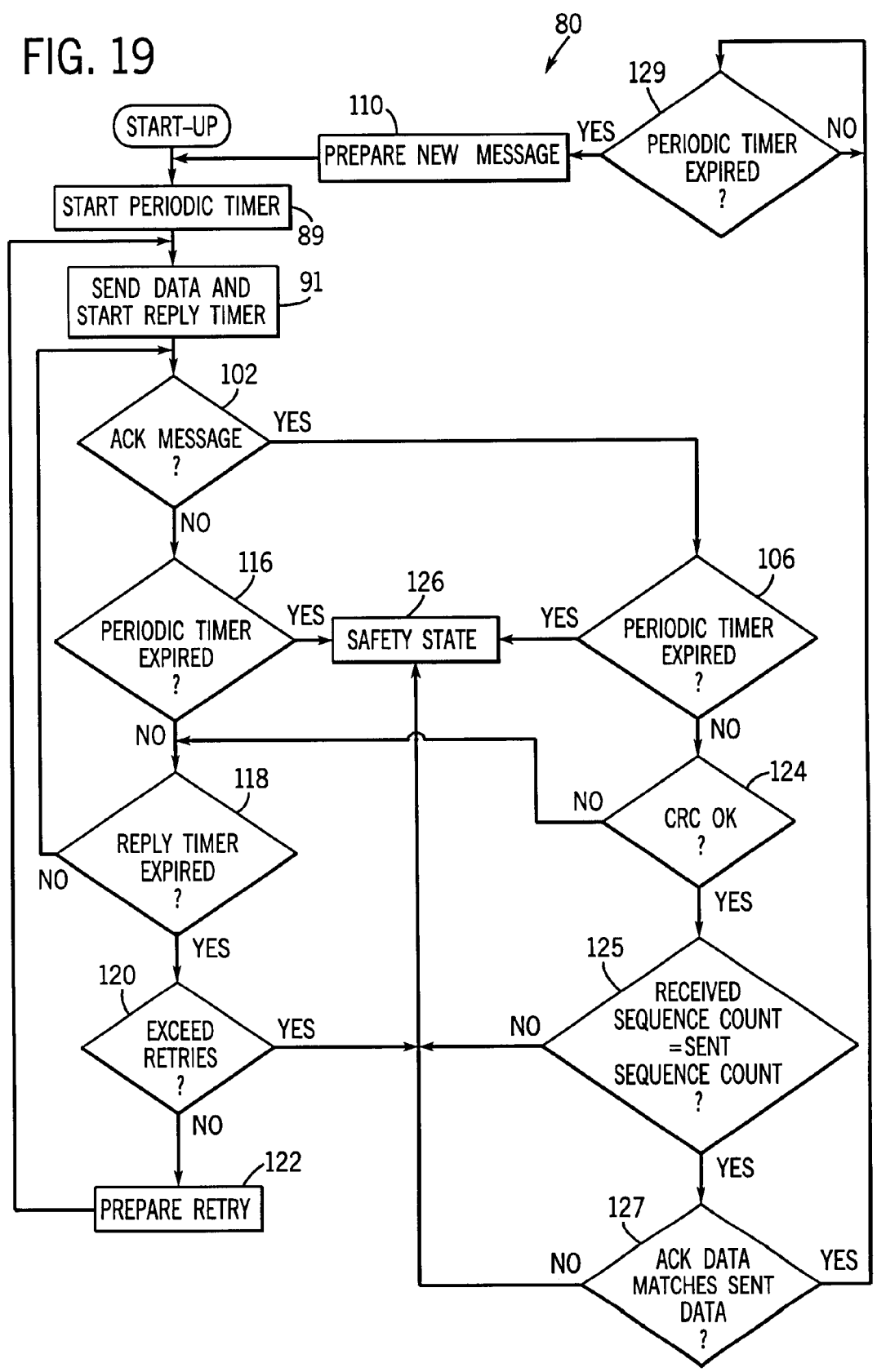
FIG. 19 is a flow chart of a program executed by the producers of FIG. 9 in implementing the safety protocol.

Referring now to FIGS. 11 and 19 for a normal, run-time transmission, the producer 80 upon run-time will send safety messages 84 (encapsulated in the standard network message 61 per safety message 60 as has been described above) to the consumer 82 per FIG. 11. This sending is indicated generally in FIG. 19. Immediately prior to sending the message 84, a periodic timer is started per process block 89 and a reply timer is started at the moment the message 84 is transmitted per process block 91. The periodic timer interval 86 is longer than the reply timer interval 88 as set in the configuration process described above.

Referring now to FIGS. 9, 11 and 20, the consumer 82 prior to receiving the message 84 is continually checking to see if the periodic time interval 86' of its own periodic timer (started at the consumer's receipt of the last message 84) has expired as indicated in decision block 92. The periodic timer value 86' is generally identical to periodic timer value 86.

If the periodic timer has expired, a failure is indicated and the program proceeds to process block 134, a safety state, as will be described below.

If timer value 86 has not expired, then at decision block 90, the consumer 82 checks to see if the message 84 has arrived. If no message 84 has arrived the program proceeds back to decision block 92 to again check if the periodic timer 86 has expired.

Assuming that a message 84 has arrived prior to expiration of the periodic timer 86, then the program proceeds to decision block 112 to check the CRC of the message 84.

Assuming that the CRC is correct, the program proceeds to decision block 96 checks to make sure that the sequence count is one greater than the sequence count of the last message received.

If the sequence count is correct, then the program proceeds to process block 94 and the periodic timer 86 is reset. At process block 95, the data is applied, for example, to an output or to update variables, and then at process block 98, an acknowledgement message 100 is returned to the producer 80.

Referring again to FIG. 19, the producer 80 receiving the acknowledge message at decision block 102, proceeds to decision block 106 to determine if the periodic timer 86 has expired.

Assuming that the periodic timer has not expired, the program proceeds to decision block 124 to check the CRC of the acknowledgement message 100. The cyclic redundancy code should match the data of the safety message 60 transmitted.

Again, assuming that the CRC is correct, the program proceeds to decision block 125 to determine whether the sequence count of the acknowledgment message 100 matches that of the message 84 that was sent.

If so, then at decision block 127, the data sent in message 84 is compared to the data of the acknowledgement message 100. If the is a match, then the program proceeds to decision block 129 where it loops until the periodic timer has expired, and then proceeds to process block 110 to prepare a new message 84.

This process is repeated for multiple transmissions of safety messages 84 and acknowledgement messages 100.

(2) Message Received but Corrupted

Referring now to FIG. 11 in one potential error the safety message 84 is corrupted for example by electromagnetic interference 85. In this case a message is received at the consumer 82, as indicated by FIG. 20 per process block 90, within the periodic timer value 86' as measured by process block 92 however there is an error in the CRC data as determined by decision block 112. In this case, the program proceeds to process block 114 and no action is taken and in particular no acknowledgement message 100 is returned.

Referring to FIG. 19, in this case there will be no acknowledgment message 100 received by the producer 80 at process block 102. The program proceeds to decision block 116 to determine if the periodic time interval 86 has expired. If so, the failure is indicated and the program proceeds to the safety state of process block 126.

Figure 12:
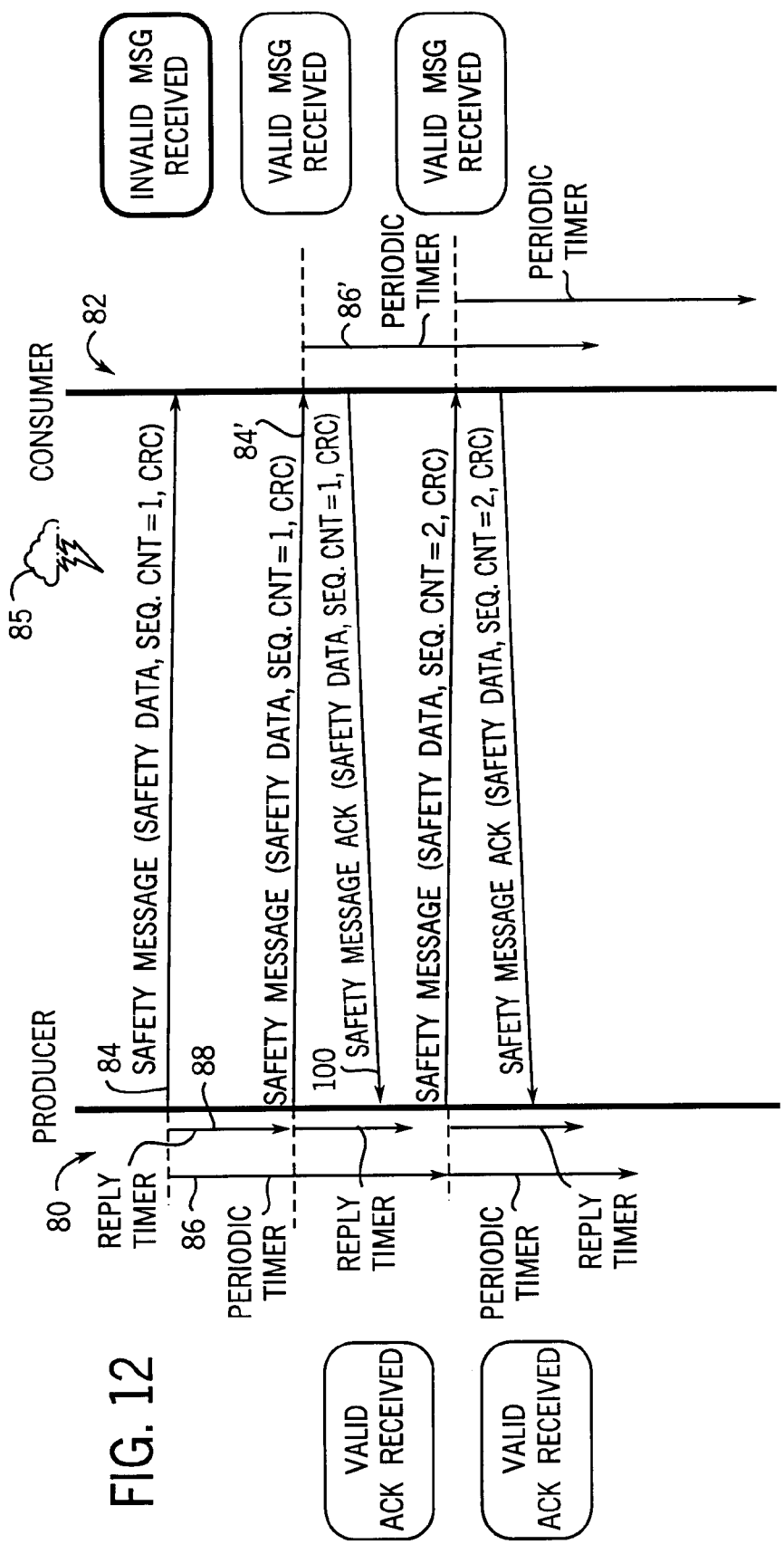
FIG. 12 is a figure similar to FIG. 11 showing protocol operation with a corrupted producer message.

If the periodic timer interval 86 has not expired, the program will proceed to decision block 118 to see if the shorter reply timer interval 88 has expired. If not, the program will loop back to process block 102. If so, the program will proceed to process block 120 to check if the retry limit has been exceeded. Initially this may not be the case and the program will proceed to process block 122 and a repeat message 84' having the same sequence count will be sent at process block 84, as also indicated by FIG. 12. If the retry limit has been exceeded, the program proceeds to the safety state 126.

This repeat message 84' will be received at the consumer 82 as indicated by process block 90 of FIG. 20 and assuming that it is correct it and that it has arrived within the periodic timer interval 86' based on the previous non-erroneous message, this message 84' results in the sending of an acknowledgment message 100 at process block 98 per the steps described above.

Typically, if only one missed transmission has occurred, the acknowledgment message 100 will occur within the periodic timer interval 86 of the producer and messages will be continued to be exchanged normally as has been previously described with respect to FIG. 11.

(3) Message Not Received

Figure 13:
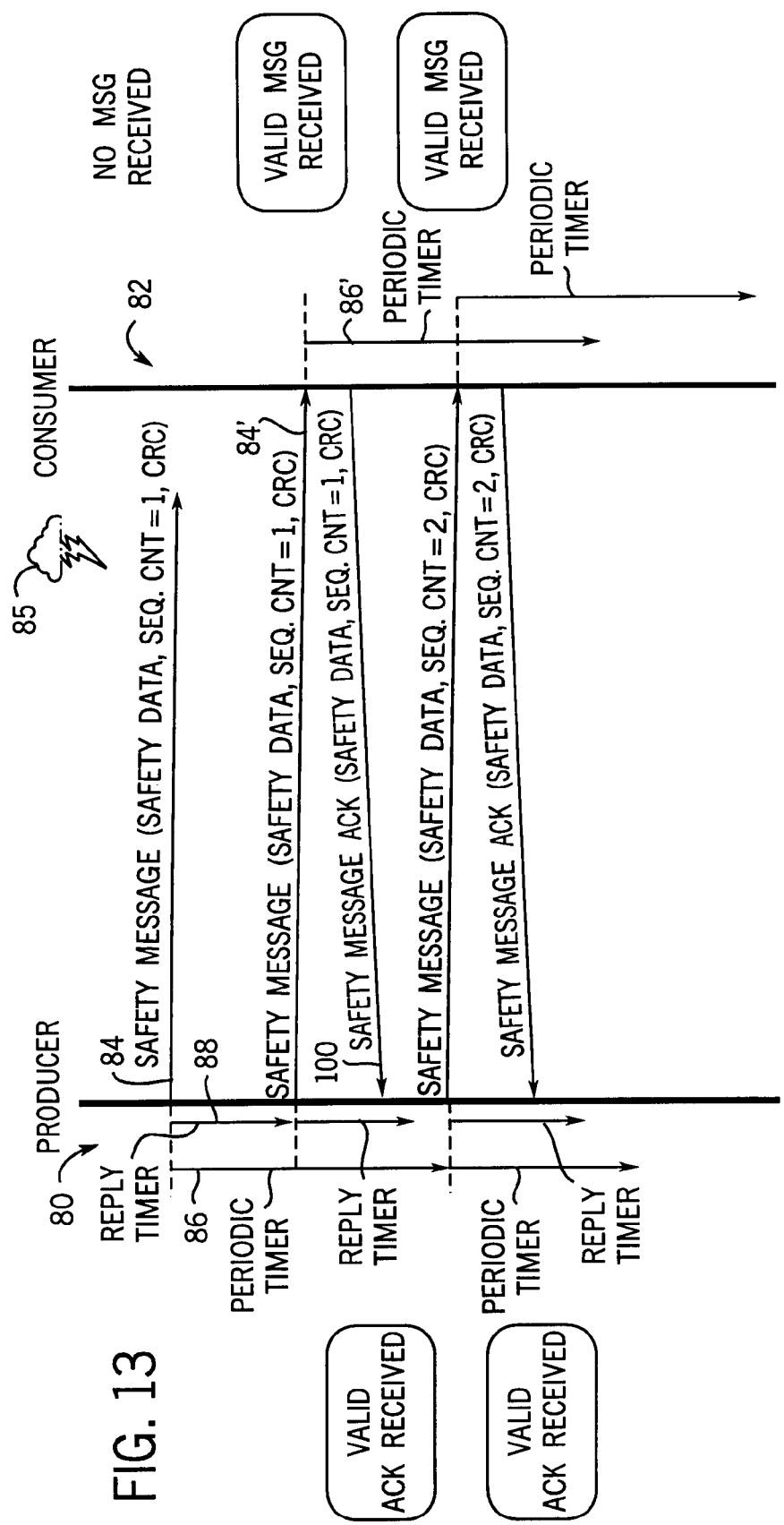
FIG. 13 is a figure similar to FIG. 11 showing protocol operation with a lost producer message.

Referring now to FIG. 13, in the previous example, the safety message 84 arrived at the consumer 82 to be detected, albeit with errors. It is possible that the safety message 84 will not arrive at the consumer 82 either as a result of such extreme interference that it is not recognizable as a message under low level network protocols, or as a result of component failures between the producer and the consumer of an intermittent nature. Under this situation, the producer 80 sends the message 84 but the consumer does not receive a message at process block 90 of FIG. 20.

The "no action" block 114 of FIG. 20 of the consumer (as described above) is thus not encountered but the result is in any case the same: the consumer 82 takes no action.

Thus, as described previously with respect to FIG. 12 at the expiration of the reply timer at the producer 80, the producer 80 will produce a second message 84' which if received will result in an acknowledgment message 100 initiating a string of normal communications.

(4) Acknowledgement Message Received but Corrupted

Figure 14:
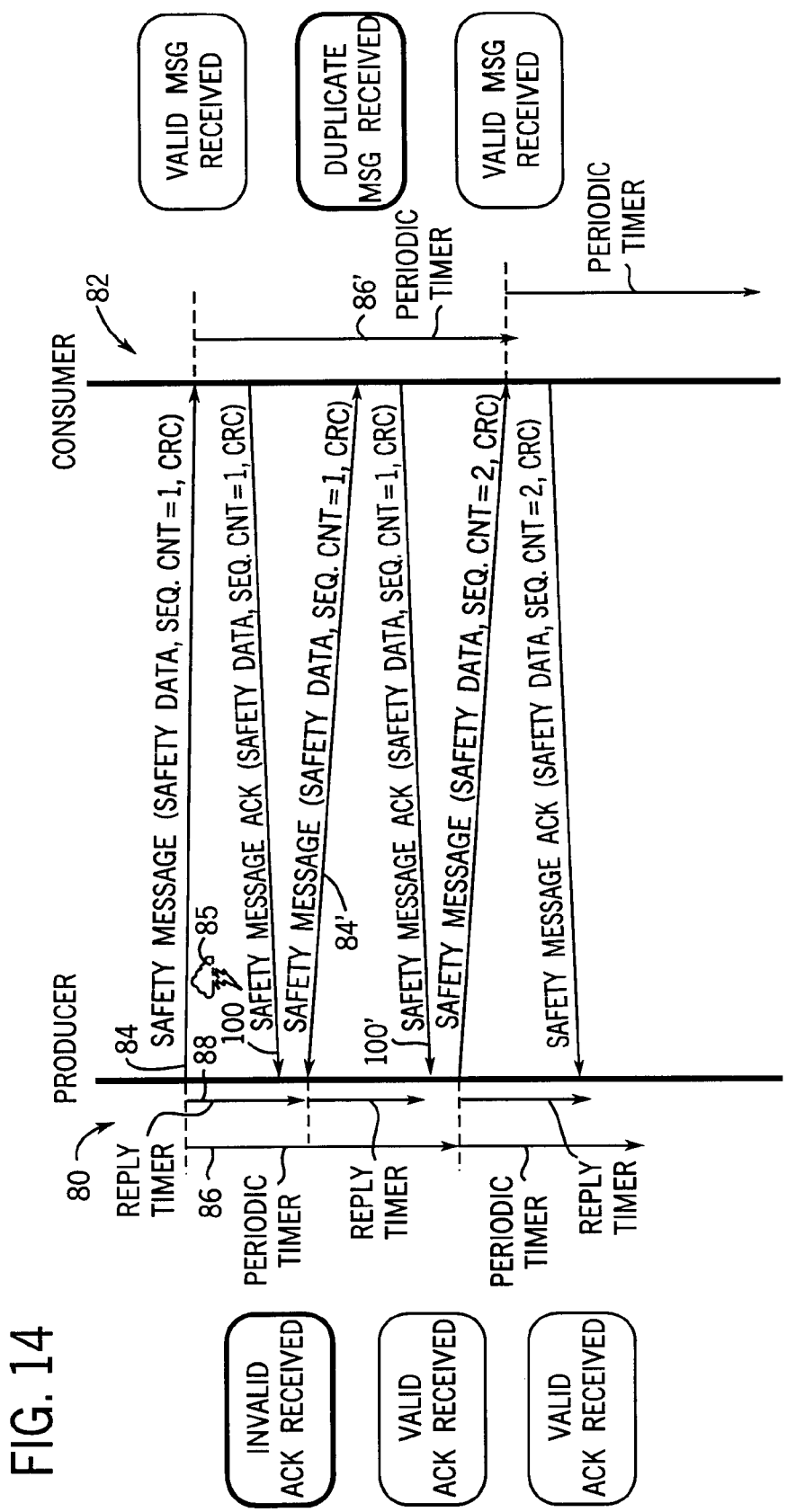
FIG. 14 is a figure similar to FIG. 11 showing protocol operation with a corrupted acknowledgement message from the consumer.

Referring now to FIG. 14 the safety message 84 may successfully reach the consumer 82 with no errors but the acknowledgement message 100 may have errors introduced by electromagnetic interference 85. In this case the producer 80 reacts as shown in FIG. 19 by decision block 106 to detect a receipt of an acknowledgment message 100 within the periodic timer interval 86. But there is an error in the data of the acknowledgment message 100.

If the CRC is correct as determined by decision block 124 and it is the sequence count that is wrong per process block 124, then the program enters the safety state 126 in which outputs and inputs of the consumer 82 are set to a predefined safety state of the configuration data. Similarly, if the sequence count is correct but the acknowledgement data does not match per decision block 127, the program proceeds to the safety state 126. If the consumer 82 is the controller 12 messages may be sent to other I/O devices, indicated in the configuration data signaling them to move to the safety state as well.

Assuming at process block 124 that the CRC code does not match the safety message 60. indicating a corruption in the safety message rather than an erroneous duplicate message, the program proceeds to decision block 118 to see if the reply timer has expired as described above. When the reply timer expires the program proceeds to process block 120 as described above and checks the retry counter to see if the retry limit has been exceeded. If so, the program proceeds to the safety state 126 however often this will not have occurred and the program proceeds to process block 122 and a retry message 84' is prepared as indicated in FIG. 14.

Assuming this retry message evokes a non-corrupted acknowledgment message 100' communication continues in normal fashion.

(5) Acknowledgment Message Not Received

Figure 15:
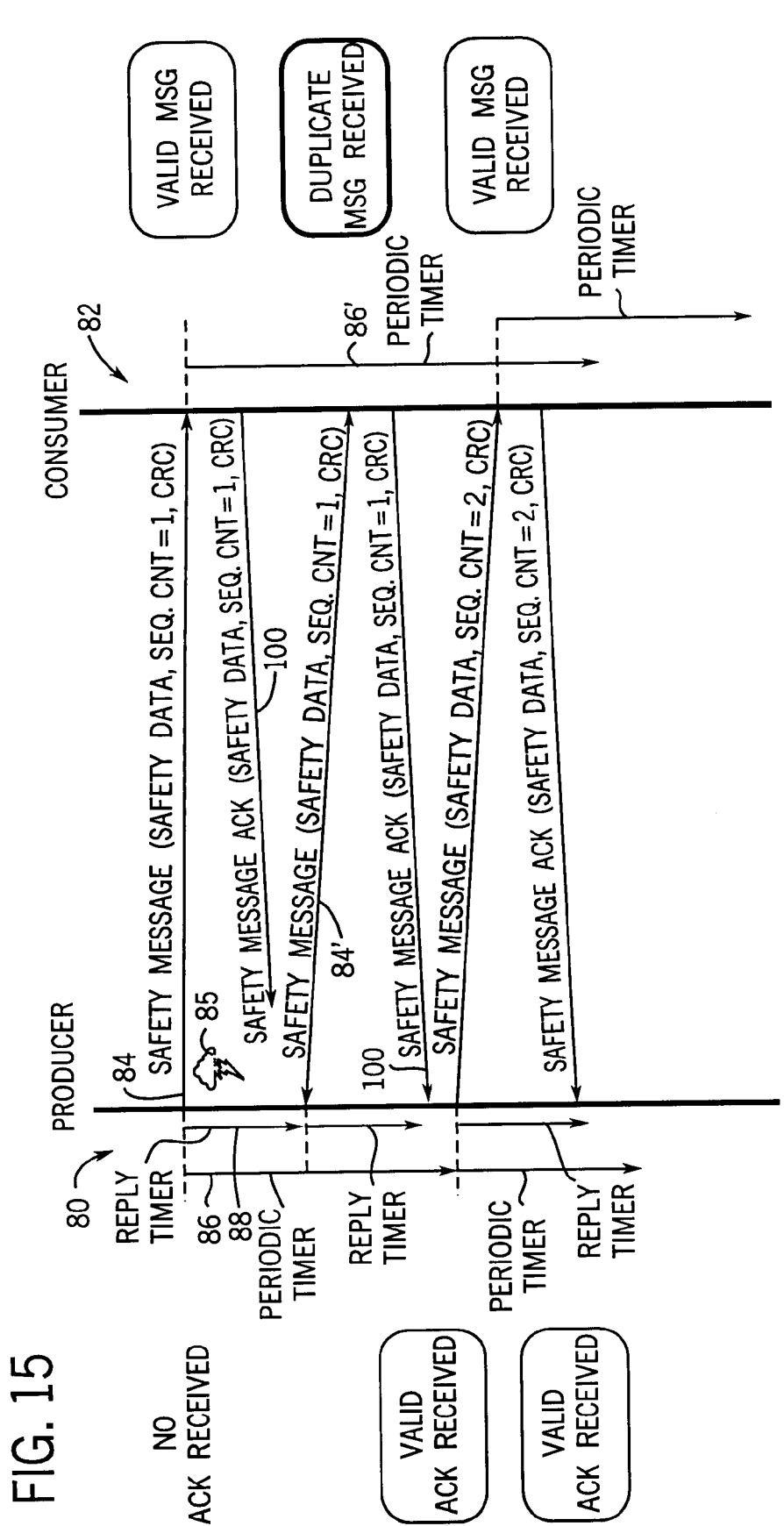
FIG. 15 is a figure similar to FIG. 11 showing protocol operation with a lost consumer acknowledgement message.
Figure 16:
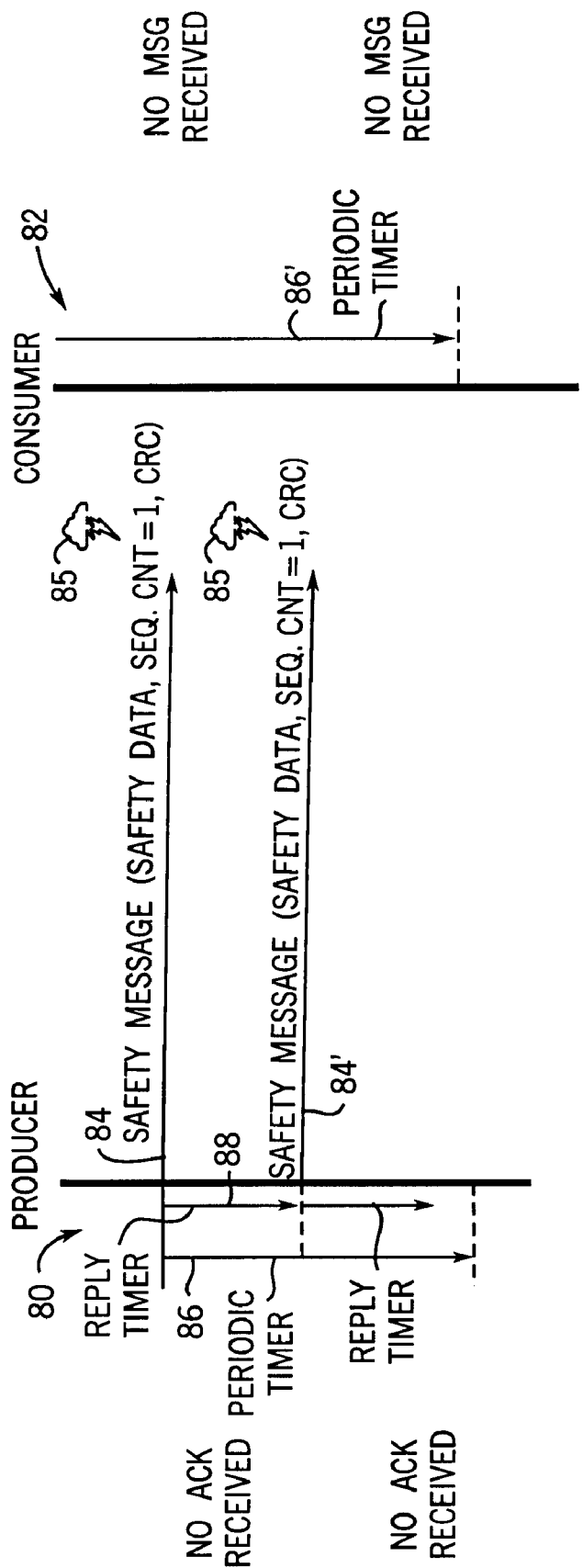
FIG. 16 is a figure similar to FIG. 11 showing protocol operation with disruption of the connection between the producer and consumer.

Referring now to FIG. 15 it is possible that the acknowledgment message 100 is lost completely either through interference or temporary communication failure. In that case, as has been previously described, a duplicate message 84 will be sent from the producer 80 however the sequence count will be identical to the sequence count of a message 84 previously received by the consumer 82. In this case as shown in FIG. 20 at process block 112 the CRC will be correct but as tested at subsequent decision block 96 the sequence code will be wrong. The program, in this case, proceeds to process block 130 to check if the sequence code is one less than that expected. If not the program proceeds to the safety state 134. If so, however, the consumer 82 must conclude that the acknowledgment message 100 was lost and an acknowledgment of the previous message is sent again by the consumer at process block 132.

(6) No Messages Received

Finally as shown in FIG. 15 the producer may be unable to connect with the consumer within the periodic interval 86' of the consumer. In that case the program proceeds to the safety state 134 directly from decision block 92 as shown in FIG. 20.

Reduction of Network Induced Skew

Figure 17:
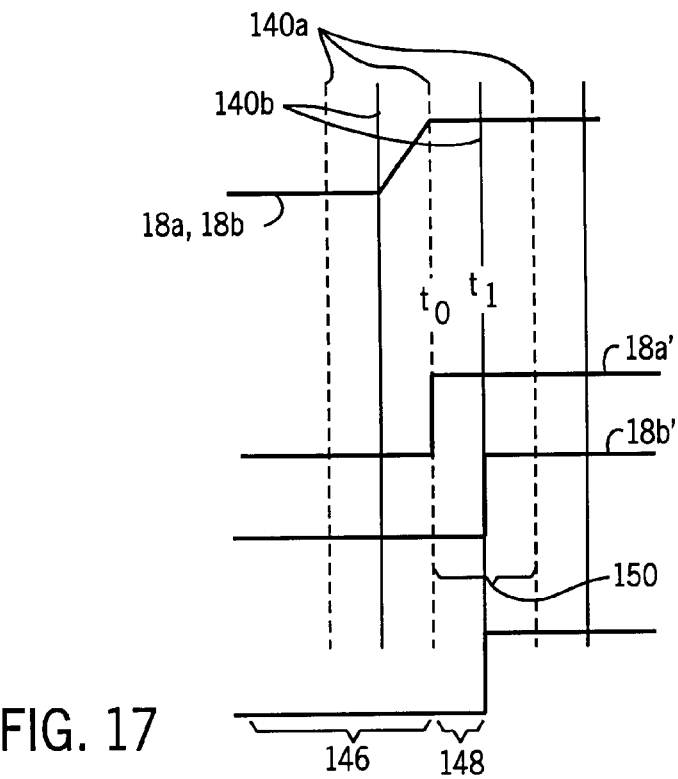
FIG. 17 is a graph of a typical input signal over time showing a skew resulting from different sampling points of two redundant input circuits.
Figure 18:
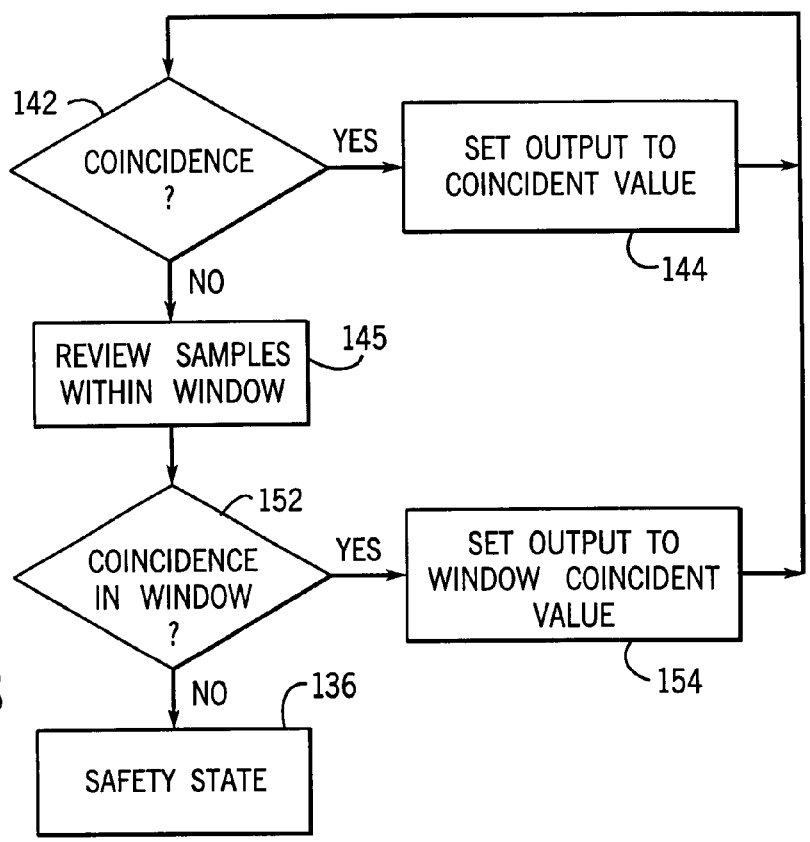
FIG. 18 is a program that may be executed by the input circuit of FIG. 1 for eliminating the skew of FIG. 17 prior to network transmission.

Referring now to FIGS. 2, 17 and 18 duplicate input signals 18a and 18b must be filtered to accommodate differences in their sampling of their associated input circuits 28a and 28b in input module 14. As shown in FIG. 17, the signal on line 18a may be sampled at intervals 140a (shown by dotted lines) whereas input signal on line 18b (possibly identical to that of 18a) may be sampled at intervals 140b shown by solid lines. This difference in sampling rates can mean at a time to that signal 18b' processed by interface circuitry 28a is in a high state whereas signal 18a as processed by interface circuitry 28a is in a high state. This skew signals 18a' and 18b' may also be caused by slight mechanical delays in dual contact systems.

If not corrected, this skew can produce a momentary erroneous state between time $t_0$ and $t_1$ suggesting a failure. These false error indications must be eliminated and this is typically done by establishing a window 150 during which lack of coincidences of the signals 18a and 18b will be ignored.

In a network system this may involve sending the signals 18a' and 18b' to the respective processors 42a and 42b via network messages. Skew in the transmission of these messages resulting from their queuing for transmission on the network 15 may require that the window 150 be increased. An additional problem in such an approach arises in the fact that the windowing process requires repeated samples of each input 18a and 18b. For example, upon a change in signal 18b (where there is lack of coincidence with signal 18a) it is necessary to continue to monitor (and transmit) the subsequent values of signal 18a within the window 150. Accordingly the network 15 is taxed with the additional transmission of multiple samples of each input. As the need for high response times increases the number of samples, network traffic also increases.

Accordingly in the present invention, using the configuration shown in FIG. 2, the microcontroller 30a and 30b communicate over bus 34 to resolve any lack of coincidence, using window filtering to determine a common value of 18a and 18b and to send this common value in separate messages in a "prefiltered state" to the processors 42. Because the processors 42 operate synchronously no additional skew is introduced or need be eliminated. As a result the skew window is much reduced and network traffic is much reduced.

In particular, referring to FIG. 18, the microcontroller 30a and 30b operate a filter program testing at decision block 142 whether two inputs are coincident. This may means that the two inputs (e.g., signals 18a and 18b) are the same or one is the inversion of the other according to a predetermined convention. If there is coincidence, then the output state of those inputs is set to their coincident value as indicated by process block 144. This corresponds generally to region 146 of FIG. 17.

The common output of process block 144 may be periodically transmitted or transmitted only at an instant of change of state.

If no coincidence occurs as indicated by region 148 of FIG. 17 then the program proceeds to process block 145 and samples within a window 150 for example starting at the present and proceeding forward two samples to see if coincidence can be found. If coincidence can be found within the window 150 as indicated by process block 152 then the window coincidence value is used as the output as indicated by process block 154.

If no coincidence can be found then the program proceeds to the safety state 136.

The microcontrollers 30a and 30b may further filter the input data by mapping a large number of inputs states into a lesser number of transmission states. These fewer numbers of transmission states (such as may be represented by less transmitted data), reduce the burden imposed on network bandwidth by high reliability systems. Further, in the case where only changes in transmission states are transmitted, the fewer number of states will cause fewer transmissions. Thus, for example, two inputs, such as from a dual button safety lockout, may be resolved to two states, "run" or "stop". The two bits of input data may be filtered to one bit of transmitted data. This compression may operate in conjunction with the windowing described above.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A high reliability industrial control system comprising:
   a controller including a first network interface to a shared serial network;
   an input module having at least two interface circuits for receiving at least two redundant input signals, the interface circuits communicating with at least one processor via an internal bus, the processor further communicating with a second network interface to the shared serial network;
   wherein the processor executes a stored program to:
      (i) receive the redundant input signals processed by the interface circuits;
      (ii) determine a coincidence of the redundant input signals within a window of a predefined time period; and
      (iii) only when there is coincidence within the window, transmitting via the second network interface, at least one coincidence signal indicating a coincident state of the redundant input signals to the controller.

2. The industrial control system of claim 1 wherein the processor executes the stored program to transmit to the controller at least two redundant messages on the shared network indicating the coincident state of the redundant input signals when there is coincidence within the window.

3. The industrial control system of claim 1 wherein the interface circuit includes two processors with each interface circuit communicating with a different processor, and
   wherein the processors communicate with each other via an internal bus and execute stored programs to:
      (i) each receive a different of the redundant input signals processed by the interface circuits;
      (ii) communicate with the other processor to determine a coincidence of the redundant input signals within a window of a predefined time period; and
      (iii) only when there is coincidence within the window, each processor transmitting to the controller via the second network interface, a common coincidence signal indicating a coincident state of the redundant input signals.

4. The industrial control system of claim 3 wherein the second network interface includes two redundant interface circuits each dedicated to one of the processors.

5. The industrial control system of claim 1 wherein the processor executes the stored program to determine a coincidence as existing when one related signal is the complement of the other related signal within the window.

6. The industrial control system of claim 1 wherein the processor executes the stored program to determine a coincidence as existing when one related signal is the same logical state as the other related signal within the window.

7. The industrial control system of claim 1 wherein the input circuits sample the redundant input signal at regular sample times and wherein the processor executes the stored program to determine a coincidence as existing within the window by detecting a lack of coincidence and reviewing a predetermined number of samples commensurate with the period of time of the window and determining a coincidence only if coincidence is obtained at one of the predetermined number of samples.

8. The industrial control system of claim 1 including further:
   an output circuit having a third network interface to the shared serial network for creating an output signal related to at least one of the redundant input signals and wherein the output circuit communicates its output signal to the input module via the third network interface and wherein the communicated output signal is the coincidence signal.

9. The industrial control system of claim 1 wherein the processor executes the stored program to only when there is no coincidence followed by coincidence within the window, transmitting via the second network interface, at least one coincidence signal indicating a coincident state of the redundant input signals to the controller.

10. The industrial control system of claim 1 wherein the processor further executes the stored program to, only when there is no coincidence within the window, enter a safety state indicating failure of the industrial control system.

11. The industrial control system of claim 10 wherein the processor executes the stored program to transmit via the second network interface on a regular basis one of a coincidence signal indicating a coincident state of the redundant input signals to the controller or a safety state signal indicating a failure of the industrial control system.

12. The industrial control system of claim 1 wherein the input module includes at least four input circuits for receiving at least two pairs of redundant input signals and wherein the processor further executes the stored program to:
   (i) receive the two pairs of redundant input signals processed by the interface circuits;
   (ii) determine a first and second coincidence of the respective pairs of redundant input signals within at least one window of the predefined time period; and
   (iii) only when there is coincidence within the window for each of the two pairs of input signals, map the state of the two pairs of inputs to a lesser number of transmission states, transmitting via the second network interface, at least one coincidence signal indicating a transmission state of the redundant input signals to the controller.

13. A method of operating an industrial control system including a controller having a first network interface to a shared serial network; and an input module having at least two interface circuits for receiving redundant input signals, the interface circuits communicating with at least one processor via an internal bus, the processor further communicating with a second network interface to the shared serial network, the method comprising the steps of:

wherein the processor executes a stored program to:
(i) receive the redundant input signals at the input module;
(ii) at the input module, determining a coincidence of the redundant input signals within a window of predefined time period; and
(iii) only when there is coincidence within the window, transmitting from the input module to the controller via the second network interface, at least one coincidence signal indicating a coincident state of the redundant input signals.

14. The method of claim 13 wherein step (iii) transmits to the controller at least two redundant messages on the shared network indicating the coincident state of the redundant input signals when there is coincidence within the window.

15. The method of claim 13 wherein the interface circuit includes two processors with each interface circuit communicating with a different processor which each receive a different of the redundant input signals processed by the interface circuits, wherein step (ii) includes the step of communicating between the two processors to determine a coincidence of the redundant input signals within a window of a predefined time period.

16. The method of claim 15 wherein the second network interface includes two redundant interface circuits each dedicated to one of the processors.

17. The method of claim 13 wherein step (ii) determines a coincidence to be existing when one related signal is the complement of the other related signal within the window.

18. The method of claim 13 wherein step (ii) determines a coincidence to be existing when one related signal is the same logical state as the other related signal within the window.

19. The method of claim 13 wherein the input circuits sample the redundant input signal at regular sample times and wherein step (ii) determines a coincidence as existing within the window by detecting a lack of coincidence and reviewing a predetermined number of samples commensurate with the period of time of the window and determining a coincidence only if coincidence is obtained at one of the predetermined number of samples.

20. The method of claim 13 wherein the control system further includes an output circuit having a third network interface to the shared serial network for creating an output signal related to at least one of the redundant input signals, and including the step of communicating the output signal from the output circuit to the input module via the third network interface to be one of the redundant input signals.

21. The method of claim 13 wherein step (iii) transmits via the second network interface, at least a coincidence signal indicating a coincident state of the redundant input signals to the controller only when there is no coincidence followed by coincidence within the window.

22. The method of claim 13 including the step of: only when there is no coincidence within the window, entering a safety state indicating failure of the industrial control system.

23. The method of claim 22 wherein step (iii) transmits via the second network interface on a regular basis one of a coincidence signal indicating a coincident state of the redundant input signals to the controller or a safety state signal indicating a failure of the industrial control system.

24. The method of claim 13 wherein the input module includes at least four input circuits for receiving at least two pairs of redundant input signals and wherein the steps include:

(i) receiving the two pairs of redundant input signals processed by the interface circuits;
(ii) determining a first and second coincidence of the respective pairs of redundant input signals within at least one window of the predefined time period; and
(iii) only when there is coincidence within the window for each of the two pairs of input signals mapping the state of the two pairs of inputs to a lesser number of transmission states, transmitting via the second network interface, at least one coincidence signal indicating a transmission state of the redundant input signals to the controller.

25. An industrial control system for operation in conjunction with a safety system, the industrial control system comprising:

a serial network;
a controller including a first network interface coupled to the serial network; and
an input module having at least two interface circuits coupled to a processing device, wherein the processing device includes a second network interface coupled to the serial network;
wherein the processing device determines whether at least two redundant input signals have been received within a time window by way of the interface circuits and, if so, transmits a signal onto the serial network; and
wherein the time window is a maximum amount of time that it would take for the redundant input signals to be provided by at least two properly-operating redundant components of the safety system in response to a state change of the safety system.

26. An industrial system for performing an industrial process comprising:

a system component that performs an operation related to the industrial process;
at least one sensor providing at least two redundant sensor signals concerning a status of the system component;
at least two separate physical conductors;
an input module having at least two interface circuits and a processing device having a first network interface, wherein the at least two interface circuits are coupled to the at least one sensor by way of the at least two separate physical conductors, respectively, by which the at least two interface circuits receive the at least two redundant sensor signals, respectively,
a controller including a second network interface; and
a network coupling the first and second network interfaces;
wherein the processing device determines whether the at least two redundant sensor signals have been received at the input module and, if so, transmits a single coincidence signal onto the serial network for receipt by the controller.

* * * * *